Figure 3:
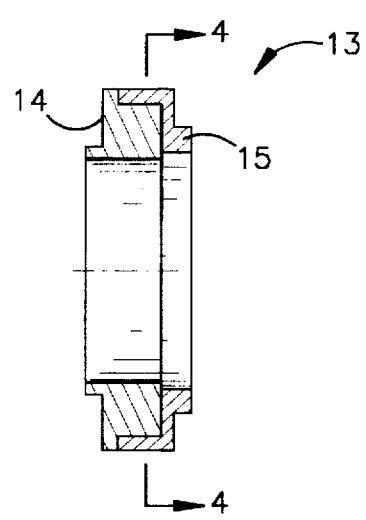

United States Patent [19]

Gerigk

[11] Patent Number: 5,797,469
[45] Date of Patent: Aug. 25, 1998

[54] STEERING VALVE

[75] Inventor: Hans-Willi Gerigk, Oberhausen, Germany

[73] Assignee: TRW Fahrwerksystems GmbH & Co. KG, Dusseldorf, Germany

[21] Appl. No.: 611,755

[22] Filed: Mar. 6, 1996

[30] Foreign Application Priority Data

Mar. 8, 1995 [DE] Germany ............ 195 08 096.3

[51] Int. Cl.$^6$ .................................. B62D 5/083
[52] U.S. Cl. .................................. 180/441; 188/306
[58] Field of Search .................. 180/441, 421, 180/422, 423; 91/375 A; 188/306, 307, 308, 309

[56] References Cited

U.S. PATENT DOCUMENTS

| | | | |
|---|---|---|---|
| 1,908,349 | 5/1933 | Hiezmann | 188/306 |
| 2,234,975 | 3/1941 | Newhart . | |
| 4,352,304 | 10/1982 | Warner . | |
| 4,768,630 | 9/1988 | Aubry et al. . | |
| 5,396,969 | 3/1995 | Joerg et al. | 180/417 |

FOREIGN PATENT DOCUMENTS

| | | |
|---|---|---|
| 0442570 | 8/1991 | European Pat. Off. . |
| 2592449 | 7/1987 | France . |
| 2755598 | 6/1978 | Germany . |
| 2918475 | 11/1980 | Germany . |
| 3302953 | 8/1984 | Germany . |
| 4023709 | 1/1992 | Germany . |
| 4242441 | 5/1994 | Germany . |
| 6092246 | 4/1994 | Japan . |
| 9113790 | 9/1991 | WIPO . |

*Primary Examiner*—Paul N. Dickson
*Attorney, Agent, or Firm*—Tarolli, Sundheim, Covell, Tummino & Szabo

[57] ABSTRACT

In order to additionally develop a conventional steering valve in such a way that it has a simple and economical design and is insensitive to pressure pulsations, a conventional steering valve is additionally developed by arranging at least one essentially coaxial chamber that extends in the shape of an arc and can be charged with hydraulic pressure either directly or indirectly on the input shaft or the output shaft, with at least one piston element that is directly or indirectly connected to the other shaft being arranged in the aforementioned chamber such that it can be moved along an essentially arc-shaped path.

6 Claims, 2 Drawing Sheets

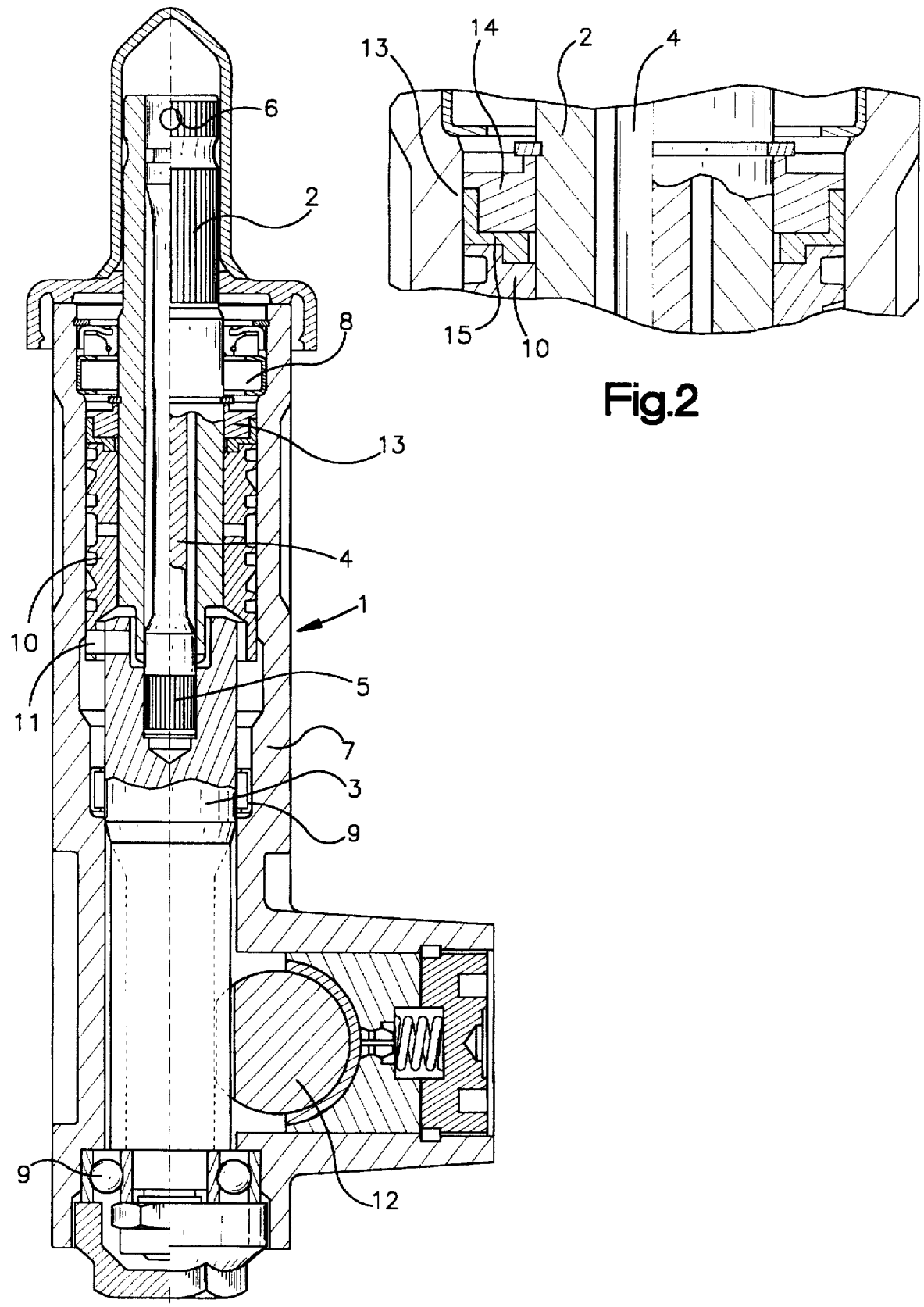

STEERING VALVE

The invention pertains to a steering valve for supplying an actuator with hydraulic pressure, consisting of an input shaft, an output shaft, a centering spring element and a valve element.

Conventional steering valves are, in particular, used in power-assisted steering systems. The design of such power-assisted steering systems is generally known. An input shaft that is connected to a steering rod is connected via a centering spring element to an output shaft that is provided with a pinion. The pinion acts on the toothed rack of a steering system. The utilization of steering valves for such steering systems is known. In conventional steering systems, a rotary valve is provided which connects or disconnects lines that end in bores if the input shaft is turned relative to the output shaft. A pump conveys pressurized hydraulic fluid through the system. Once the input shaft is turned relative to the output shaft, hydraulic pressure is supplied to a hydraulic motor that boosts the movement of the toothed rack in one of the two possible directions.

The actuation of such steering valves is caused by turning the input shaft relative to the output shaft, wherein a torsional moment must be overcome by the centering spring element arranged between said shafts, e.g., a torsion rod.

In one type of steering valve, a valve sleeve is provided which is engaged with the output shaft and surrounds the input shaft. This valve sleeve comprises control grooves that are moved such that they are situated congruently with bores for conveying the hydraulic medium which are arranged outside a housing.

In another known type of steering valve, bores that essentially extend in the axial direction are moved such that they are situated congruently.

In conventional steering valves of this type, torsional vibrations represent one particular problem. These torsional vibrations primarily result from uneven road conditions that are transmitted to the steering system through the wheels of the motor vehicle as well as pressure pulsations that manifest themselves in a relative vibrational movement between the input shaft and the output shaft or the valve element. This can lead to rattling of the steering wheel of the steering system and also can produce annoying noise.

A number of solutions for these problems are known from the state of the art. WO 91/13790 proposes a special hose system that can be expanded for compensating the pressure pulsations. DE 2,755,598 A1 proposes admixing air to the hydraulic medium. According to DE 4,023,709 A1, providing additional damping volumes is proposed. DE 2,918,475 A1 discloses the utilization of a hydraulic motor between the pump and the steering valve.

In the previously described solutions, the steering valves are associated with somewhat major expenditures regarding the material requirement and the assembly and adjustment procedures, i.e., these steering valves are very expensive. In addition, all these solutions require additional structural elements that are arranged outside the steering valve and are unable to entirely eliminate torsional vibrations.

The present invention is based on the objective of additionally developing a conventional steering valve in such a way that said steering valve has a simple and economical design and is not influenced by torsional vibrations.

According to the invention, this objective is attained by additionally developing a conventional steering valve in such a way that at least one essentially coaxial chamber that extends in the shape of an arc and can be filled with a pressure medium is arranged either directly or indirectly on the input shaft or the output shaft, with at least one piston element that is directly or indirectly connected to the other shaft being arranged inside the aforementioned chamber such that it can be moved along an essentially arc-shaped path.

In the embodiment according to the invention, a torsional vibration damper of a simple design is arranged on a conventional power-assisted steering valve. This torsional vibration damper consists of at least one arc-shaped chamber and a piston element that can be moved inside said chamber along an essentially arc-shaped path. The chambers are filled with a viscous fluid, preferably the gear lubricant used. Torsional vibrations are damped by the pressure buildup in the chamber which results from the relative movement between the piston element and the chamber element as well as the force that acts on the piston and results from the aforementioned relative movement, i.e., a moment that acts on the input shaft and is directed opposite the torsional vibrations. The term directly or indirectly connected to the elements should be interpreted in such a way that additional elements can be arranged in between. One particularly important aspect of the present invention is that the chamber can be filled with different fluids. The chamber can also be pressurized. The damping effect of the torsional vibration damper depends on the geometric design of the damper components, in particular the gap widths and the effective surfaces; in addition, the damping effect also depends on the torsional vibration frequency and amplitude as well as the viscosity or density of the damping fluid. Ideally, an annular cylinder element and an annular piston element form a closed system such that the fluid flows from the chamber that becomes smaller into the chamber that becomes larger through the leakage gaps between the piston element and the cylinder element once both damping elements are turned with respect to one another, namely due to the pressure buildup in the chamber that becomes smaller. The thusly caused different pressure buildup in the chambers exerts a force on the piston elements which, with reference to the valve axis, exerts a moment on the input shaft which is directed opposite the instabilities and consequently damps said instabilities. In order to simplify the filling of the damper chamber with a viscous fluid, the chamber can be initially filled with steering fluid via the leakage gaps between the annular cylinder element and the annular piston element and their surroundings. However, this leakage flow which continues during the operation of the steering system and can possibly be augmented by unacceptable tolerances reduces the damping ability and is, in principle, undesirable. Consequently, the functional principle of the torsional vibration damper proposed is purely hydraulic, i.e., the torsional vibration damper is automatically charged with pressure once its structural components carry out a relatively high-frequency excursion. This means that the torsional vibration damper operates independently of the steering gear operating pressure and the steering valve control movements. Its main advantage can be seen in its high damping ability as well as the fact that the valve characteristic is not influenced. The damping effect does not depend on the system pressure and is also not influenced by said system pressure.

According to one advantageous embodiment of the invention, the at least one chamber that is charged with hydraulic pressure is realized in the form of an annular chamber. This chamber is divided several times such that a number of annular chambers are formed. These annular chambers can be realized identically or differently. According to one advantageous embodiment of the invention, the at least one piston element is realized in the form of a radial web on a ring. The annular chamber as well as the radial web(s) are advantageously realized on annular elements. It is particularly advantageous that the ring elements are realized in the form of bushings, with the web element being inserted into the chamber. The invention advantageously proposes that one of the bushings be fastened to the input shaft. If the steering valve is provided with a valve element in the form of a valve sleeve, the invention proposes fastening the other bushing to the aforementioned valve sleeve.

Consequently, the previously described annular cylinder element can be utilized as a torsional vibration damper. If a fluid of variable, controllable viscosity is used, the annular cylinder element can be alternatively or additionally utilized as a reaction and/or centering element because the thusly created reaction moment is, among other things, a function of the viscosity of the fluid.

The invention supplements a conventional steering valve with a simply designed device that can be easily assembled and, in particular, renders the steering valve insensitive to interfering influences, e.g., torsional vibrations.

Figure 4:
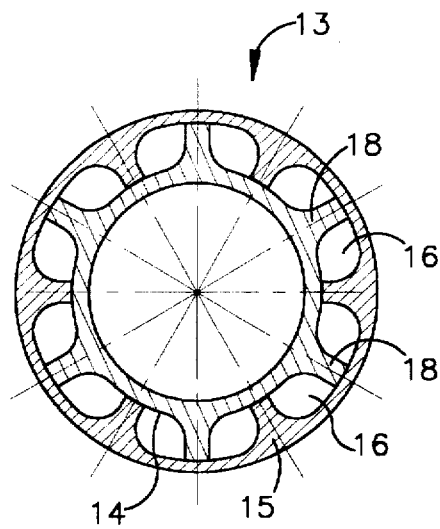
Figure 5A:
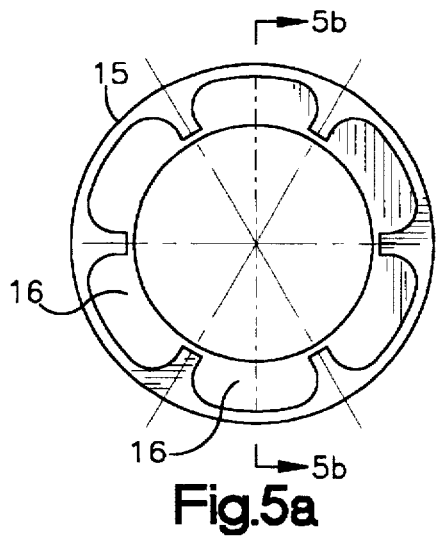

Additional advantages and characteristics of the invention are described below with reference to the figures. The figures show:

FIG. 1: a sectional representation of one embodiment of a steering valve;

FIG. 2: An enlarged view of a portion of the steering valve shown in FIG. 1;

FIG. 3: a sectional representation of one embodiment of an annular cylinder element;

FIG. 4: a sectional representation along line 4—4 in FIG. 3;

FIG. 5a: one embodiment of an annular chamber element; and

Figure 5B:
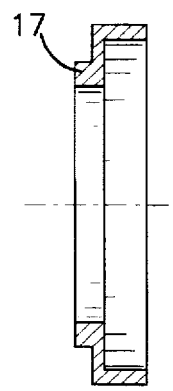
Figure 6A:
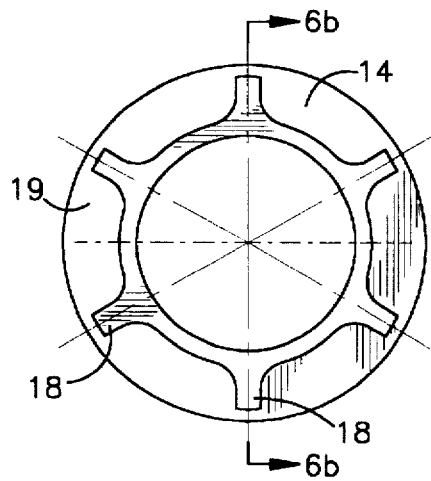
Figure 6B:
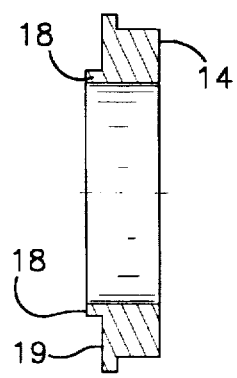

FIG. 5b: A cross section along line 5b—5b in FIG. 5a;

FIG. 6a: one embodiment of an annular piston element,

FIG. 6b: A cross section taken along line 6b—6b in FIG. 6a.

The steering valve 1 shown in FIG. 1 consists of an input shaft 2 and an output shaft 3 which are connected to one another by means of a torsion rod 4 such that both shafts can be moved relative to one another, namely in accordance with the rigidity of the torsion rod. The torsion rod 4 is inserted into the output shaft 3 within the connecting region 5 and connected to the input shaft 2 within the connecting region 6, namely with the aid of a pin. This arrangement is inserted into a housing 7 and arranged in a rotatable fashion by means of bearings 8 and 9. The input shaft 2 is connected to a not shown steering column/wheel. A valve sleeve 10 surrounds the input shaft 2 and is connected to the output shaft within the connecting region 11. When the input shaft 2 is moved relative to the output shaft 3 and consequently also the valve sleeve 10, control grooves are moved relative to one another in such a way that hydraulic pressure is supplied to a not shown hydraulic motor. The output shaft 3 is simultaneously engaged with a rack-and-pinion steering system 12 that is not illustrated in detail.

An annular cylinder element 13 that is illustrated in detail in FIG. 2 is arranged between the input shaft 2 and the valve sleeve 10. An annular piston element 14 is connected to the input shaft 2 such that both components rotate collectively, with an annular chamber element 15 being connected to the valve sleeve 10 such that these two components also rotate collectively.

The individual components of the annular cylinder element 13 are shown in FIGS. 3–6.

The annular cylinder element 13 consists of the annular piston element 14 and the annular chamber element 15. The annular piston element 14 is realized in the form of an annular element that comprises radially protruding pistons 18. In addition, a cover-like widening 19 is arranged on this annular piston element.

The annular chamber element 15 comprises a number of chambers 16 that are arranged in the ring. Consequently, a base 17 remains as viewed in the axial direction. In the embodiment shown, a total of six chambers 16 and six pistons 18 are provided. FIG. 4 shows how the pistons fit into the chambers in such a way that a total of six annular cylinders is attained. Each of these annular cylinders is filled with a viscous fluid such that a reaction pressure is built up in the cylinder during the slightest, however, high-frequency excursion of the input shaft or the piston, namely due to the incompressibility of the fluid. This reaction pressure generates a reaction moment via the piston which damps the torsional vibrations. During a low-frequency excursion, i.e., a conventional steering movement, no significant reaction pressure is built up in the cylinders due to the leakage gaps between the cylinder and the piston and their surroundings. This insignificant reaction pressure has no negative affects on the functional characteristics of the steering gear valve. The previously described annular cylinder element consequently can be utilized as a torsional vibration damper. Alternatively or additionally, the annular cylinder element can also be utilized as a reaction and/or centering element if a fluid of variable, controllable viscosity is used, namely because the thusly created reaction moment is, among other things, a function of the viscosity of the fluid.

| List of reference numerals | |
|---|---|
| 1 | Steering valve |
| 2 | Input shaft |
| 3 | Output shaft |
| 4 | Torsion rod |
| 5 | Connecting region |
| 6 | Connecting region |
| 7 | Housing |
| 8 | Bearing |
| 9 | Bearing |
| 10 | Valve sleeve |
| 11 | Connecting region |
| 12 | Toothed rack |
| 13 | Annular cylinder element |
| 14 | Annular piston element |
| 15 | Annular chamber element |
| 16 | Chamber |
| 17 | Base |
| 18 | Piston |
| 19 | Cover |

I claim:

1. A steering valve supplying hydraulic fluid to a hydraulic motor, said steering valve comprising:

an input shaft;

an output shaft;

a spring element connecting said input shaft to said output shaft;

a valve casing surrounding said input shaft and connected to said output shaft;

a housing surrounding said valve casing; and means for damping torsional vibration, said means comprising a ring-shaped chamber element connected with one of said shafts and a ring-shaped piston element connected with the other of said shafts, said chamber element and said piston element being disposed coaxially and concentrically and being relatively rotatable;

said chamber element and said piston element defining a series of chambers spaced circumferentially around said input shaft, said series of chambers being isolated from the hydraulic fluid of the steering valve, each of said series of chambers having incompressible fluid therein;

each of said series of chambers being defined in part by interdigitated portions of said chamber element and said piston element which are movable circumferentially of said input shaft and relative to each other to cause said incompressible fluid to flow from at least one of said series of chambers to an adjacent one of said chambers in an arc-shaped flow path defined by one of said interdigitated portions and one of said chamber element and said piston element.

2. The steering valve according to claim 1 wherein said chamber element and said piston element comprise bushings that are nested one inside the other.

3. The steering valve according to claim 1 wherein said chamber element is attached to said valve casing.

4. The steering valve according to claim 3 wherein said annular piston element is attached to said input shaft.

5. The steering valve according to claim 1 wherein said fluid in said cylinder element is a viscous fluid.

6. The steering valve according to claim 1 wherein said chamber element and said piston element form a closed and sealed fluid system.

* * * * *